United States Patent [19]

Bailey

[11] Patent Number: 4,722,423

[45] Date of Patent: Feb. 2, 1988

[54] BRAKE ACTUATING MECHANISM

[75] Inventor: Walter W. Bailey, Warwick, United Kingdom

[73] Assignee: Automotive Products plc, Leamington Spa, England

[21] Appl. No.: 927,064

[22] Filed: Nov. 5, 1986

[30] Foreign Application Priority Data

Nov. 6, 1985 [GB] United Kingdom ............... 8527292

[51] Int. Cl.$^4$ ............................................ F16D 55/26
[52] U.S. Cl. ..................................... 188/72.6; 92/65;
 92/108; 92/114; 92/129; 188/71.4; 188/106 F;
 192/70; 192/83
[58] Field of Search ................. 188/71.4, 72.6, 106 F;
 192/70, 83, 85 AB; 92/65, 108, 113, 114, 115, 129

[56] References Cited

U.S. PATENT DOCUMENTS 3,490,562 1/1970 Press ............................... 188/106 F
4,089,392 5/1978 Ostrowski ........................ 188/71.4
4,363,382 12/1982 Anderson ...................... 188/72.6 X
4,549,636 10/1985 Price et al. .................... 188/106 F
4,550,810 11/1985 Price et al. ...................... 188/71.4

Primary Examiner—George E. A. Halvosa
Attorney, Agent, or Firm—Solon B. Kemon

[57] ABSTRACT

A brake actuating mechanism includes a housing defining a cylinder and a tubular piston, slidingly sealed within the cylinder. A pull-rod passes through the piston and is provided at one end with member for connection to a brake linkage mechanism. The other end of pull-rod is provided with abutment member which engages one end of a guide spool, the other end of the guide spool engaging the end of the piston. A pivot member is provided between the guide spool and the piston to permit rocking of the guide spool and pull-rod relative to the piston. A lever mechanism may act on the guide spool to provide for mechanical actuation of the brake.

6 Claims, 1 Drawing Figure

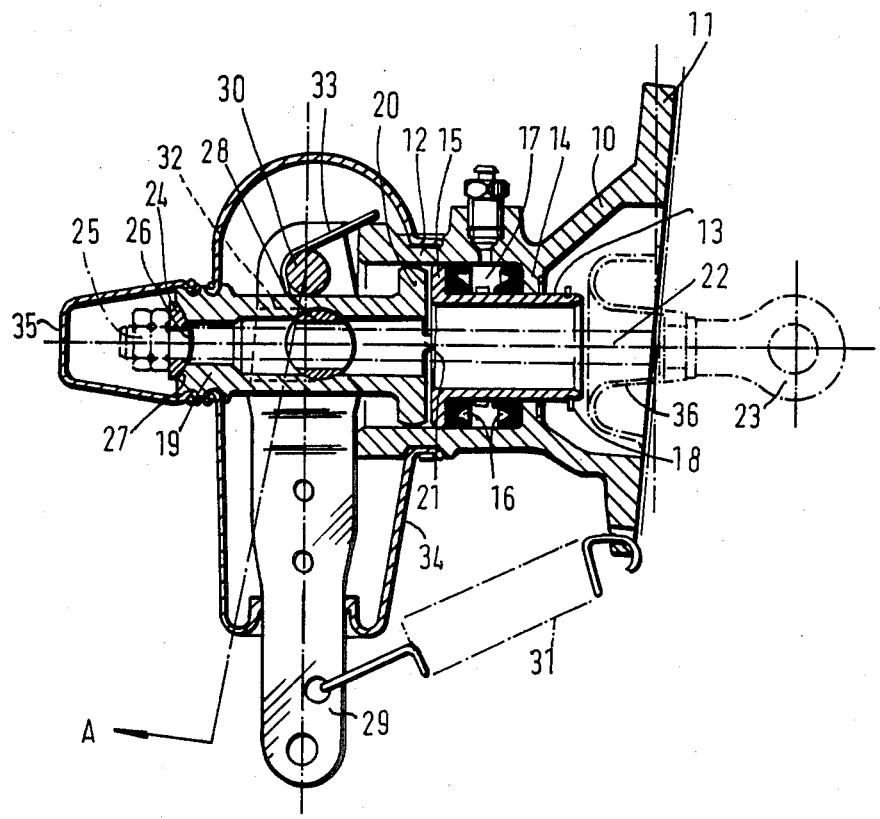

BRAKE ACTUATING MECHANISM

BACKGROUND OF THE INVENTION

The present invention relates to a brake actuating mechanism for a separating plate type disc brake.

With separating plate type disc brakes, one or more rotating discs having frictional linings, are forced into frictional engagement with static surfaces, by means of a pair of plate members which are arranged to separate upon rotation of one plate relative to the other. Separation may be caused by a ball and ramp mechanism, said mechanism preferably being arranged to operate with relative movement of the plates in both directions. Relative movement of the plates may be achieved by applying opposed tangential forces tot he two plates, through toggle links connected to lugs on the outer circumferences of the plates, these tangential forces being applied by an actuator which applies a pulling load to the toggle links.

With this form of brake, the frictional drag of the rotating disc on the plate may be arranged to cause further rotation of one plate relative to the other and thus produce a servo effect. This further rotation of the plates will however require rotation of the linkage mechanism and corresponding tilting movement of the pull-rod connecting the linkage mechanism to the actuating mechanism. This tilting movement of the pull-rod imposes a side load on the piston of the hydraulic actuator, which will cause scuffing on the actuator bore and will ultimately lead to failure of the piston seal. Furthermore, where the actuator includes a mechanical linkage for a hand brake, the non-linear force applied by the mechanical linkage will produce further side loads on the actuator piston.

SUMMARY OF THE INVENTION

According to one aspect of the present invention a brake actuating mechanism comprises; a housing defining a cylinder and a tubular piston mounted within said cylinder, the cylinder and piston defining a pressure chamber between their opposed concentric walls, into which a pressurised fluid may be introduced to move the piston axially relative to the cylinder; a guide spool abutting the leading end of the piston, said guide spool having a flange portion which engages the bore of the cylinder in an area beyond the limit of normal travel of the piston, the edge of said flange portion being contoured so as to permit rocking of the guide spool within the cylinder; and a pull-rod adapted to be connected at one end to a brake linkage mechanism, said pull-rod passing through the piston and guide spool with a significant clearance and having an abutment which engages the free end of the guide spool, the abutment and adjacent end of the guide spool being arranged to permit rocking of the pull-rod with respect to the guide spool and piston; the end of said guide spool adjacent to the piston being provided with a linear pivot formation which abuts the end of the piston and permits the spool to rock relative to the piston, in the same plane as the pull-rod.

According to a further aspect of the present invention, the guide spool is connected to a lever arrangement by means by which the spool may be moved away from the piston under mechanical control.

BRIEF DESCRIPTION OF THE DRAWINGS

An embodiment of the invention is now described, by way of example only, with reference to the accompanying drawing which shows a sectional elevation of a brake actuating mechanism formed in accordance with the present invention.

DESCRIPTION OF A PREFERRED EMBODIMENT

As illustrated in the accompanying drawing, the brake actuating mechanism comprises a housing 10 having a flange 11 by means of which it may be secured to a brake housing by means of a plurality of circumferentially spaced bolts (not shown). The housing 10 defines a cylinder 12 with a stepped portion 14 adjacent the flange end of the housing 10. A tubular piston member 13, has a body portion which engages the stepped portion 14 of cylinder 12 and a flanged head portion 15 which engages the large diameter bore of the cylinder 12. A pair of sealing elements 16 are positioned between the concentric surfaces of the body of the piston 13 and the larger diameter bore of cylinder 12 one abutting the stepped portion 14 of cylinder 12 and the other abutting the flanged head portion 15 of piston 13, so as to define a pressure tight chamber 17. Inlet means (not shown) is provided to said chamber for connection to a hydraulic brake actuation system. A circlip 18 is provided around the end of piston 13 adjacent to flange 11 for engagement with the stepped portion 14 of the cylinder 12 to limit the axial movement of piston 13 within the cylinder 12.

A guide spool 19 is located within the open end of cylinder 12, a flange portion 20 of the guide spool 19 engaging the bore of the cylinder 12. The end of spool 19 adjacent piston 13 is provided with a linear pivot formation 21 which abuts the head portion 15 of piston 13. The edge of flange portion 20 of spool 19 is contoured, so as to permit rocking of the spool 19 within cylinder 12 relative to the piston 13, about the pivot formation 21.

A pull-rod 22 passes through the piston 13 and spool 19, a significant clearance being provided therebetween. The end of the pull-rod adjacent the flange poriton 11 of housing 10 is provided with coupling means 23 by means of which it may be connected to a brake linkage mechanism. The other end of the pull-rod is provided with a collar 24 which abuts the end of spool 19, said collar 24 being located on the pull-rod by means of a pair of lock nuts 25. The surface 26 of collar 25 that abuts spool 19 is of part-spherical configuration and the opposing surface 27 of spool 19 is likewise of part-spherical configuration but of greater curvature than the surface 26, so as to permit rocking movement between the pull-rod 22 and spool 19.

A bifurcated lever 29 pivotted to the housing 10 by pin 30 is connected to spool 19 by means of the trunnion coupling 28. A return spring 31 acts on lever 29 to return it to the non-actuated position indicated in the drawing.

The journals of the trunnion 28 are located in open slots 32 in the lever 29 and a return spring 33 acts on the trunnion journals 28 to bias the spool 19 towards the piston 13.

Flexible boots 34, 36 are provided between the housing 11 and rear spool 19; and between the pull-rod 22 and the flange 11; and an end cap 35 is provided on the end of the spool 19, to protect the mechanism.

In operation, the housing 10 will be secured to the brake housing of a separating plate type disc brake and coupling 23 will be connected to the brake linkage mechanism.

For hydraulic actuation, pressurised hydraulic fluid will be delivered from the braking system to the pressure chamber 17 and will force piston 13 along the cylinder 12 away from the stepped portion 14. This movement will be transmitted via the guide spool 19, collar 24 and lock nuts 25 to the pull rod 22 which will pull the brake linkage mechanism to apply the brake. The rocking movement of pull-rod 22 which is permitted by the curved surfaces 26, 27 of collar 24 and spool 19 will enable movement of the brake linkage mechanism to produce a servo effect. The side loads applied to the spool 19 through collar 24 will be transmitted via the flange portion 20 to the walls of the cylinder 12, the pivot connection between the spool 19 and piston 13, by pivot formation 21, avoiding transmission of these side loads to the piston 13. Transmission of side loads by the flange 20 to the walls of cylinder 12 will cause scuffing, but this will be clear of the normal travel of piston 13 which is limited by a circlip 18 and will consequently not damage the seal between the piston 13 and cylinder 12. The open slots 32 in the lever 29 will permit movement of the spool 19 against the spring 33. When the hydraulic pressure is released, spring 33 will then return the spool 19 and piston 13 to the position illustrated and the pressure on the pull-rod will be released thus releasing the brake mechanism.

For mechanical actuation by means of a hand brake, the hand brake mechanism will be connected to lever 29 to apply a pull, when actuated, in the direction of Arrow A. Movement of the lever in this direction will be transmitted to guide spool 19 through trunnion connection 28 and this movement will be transmitted to the pull-rod 22 through collar 24 and lock nuts 25. As described above, the engaging surfaces of collar 24 and spool 19 will permit rocking movement of the pull-rod 22 and any side loads imposed will be transmitted via the flange portion 20 of spool 19 to the walls of cylinder 12. This mechanism will also accommodate any side loads imposed due to the non-linear pull applied to the spool 19 by lever 29.

Adjustment of the brake mechanism may be made by means of the lock nuts 25 by which the effective length of the pull-rod may be adjusted.

I claim:

1. A brake actuating mechanism comprising; a housing defining a cylinder and a tubular piston mounted within said cylinder, the cylinder and piston defining a pressure chamber between their opposed concentric walls, into which pressurised fluid may be introduced to move the piston axially relative to the cylinder; a guide spool abutting the leading end of the piston, said guide spool having a flange portion which engages the bore of the cylinder in an area beyond the limit of normal travel of the piston, the edge of said flange portion being contoured so as to permit rocking of the guide spool within the cylinder; and a pull-rod adapted to be connected at one end to a brake linkage mechanism, said pull-rod passing through the piston and guide spool with a significant clearance and having an abutment which engages the free end of the guide spool, the abutment and adjacent end of the guide spool being arranged to permit rocking of the pull-rod with respect to the guide spool and piston; the end of said guide spool adjacent to the piston being provided with a linear pivot formation which abuts the end of the piston and permits the spool to rock relative to the piston, in the same plane as the pull-rod.

2. A brake actuating mechanism according to claim 1 in which a lever mechanism is connected to the guide spool, by means of which the guide spool may be moved independently of the piston.

3. A brake actuating mechanism according to claim 2 in which there is a trunnion connection between the lever and guide spool.

4. A brake actuating mechanism according to claim 3 in which the trunnion journals are mounted in elongated slots in the lever and are biassed towards the piston end of the slots.

5. A brake actuating mechanism according to claim 1 in which the surfaces of the abutment and the spool, which inter-engage, are of part-spherical configuration, the curvature of the surface of the spool being greater than the curvature of the abutment.

6. A brake actuating mechanism according to claim 1 in which the abutment is formed by a collar which is secured on the pull-rod by means of adjusting nuts.

* * * * *